United States Patent
Balakrishnan

(10) Patent No.: US 11,556,624 B2
(45) Date of Patent: Jan. 17, 2023

(54) AUTOMATIC ANONYMOUS VISITOR IDENTITY RESOLUTION USING MACHINE LEARNING

(71) Applicant: Intuit Inc., Mountain View, CA (US)

(72) Inventor: Jeyendran Balakrishnan, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 367 days.

(21) Appl. No.: 16/862,149

(22) Filed: Apr. 29, 2020

(65) Prior Publication Data

US 2021/0342429 A1     Nov. 4, 2021

(51) Int. Cl.
*G06F 21/32*     (2013.01)
*G06F 17/16*     (2006.01)
*G06F 17/18*     (2006.01)
*G06N 20/20*     (2019.01)

(52) U.S. Cl.
CPC .............. *G06F 21/32* (2013.01); *G06F 17/16* (2013.01); *G06F 17/18* (2013.01); *G06N 20/20* (2019.01)

(58) Field of Classification Search
CPC .......... G06F 21/32; G06F 17/16; G06F 17/18; G06F 21/316; G06N 20/20; G06N 3/08; G06N 20/10
See application file for complete search history.

(56) References Cited

U.S. PATENT DOCUMENTS

| | | | |
|---|---|---|---|
| 10,091,312 B1 * | 10/2018 | Khanwalkar | H04L 67/306 |
| 10,331,950 B1 * | 6/2019 | Suriyanarayanan | H04L 67/306 |
| 2014/0080428 A1 * | 3/2014 | Rhoads | G06F 16/5838 |
| | | | 455/88 |
| 2014/0180807 A1 | 6/2014 | Boal | |
| 2019/0319977 A1 * | 10/2019 | Gottschlich | G06K 9/6256 |
| 2021/0027191 A1 * | 1/2021 | Sinha | G06N 20/20 |
| 2021/0281650 A1 * | 9/2021 | George | H04L 67/146 |

OTHER PUBLICATIONS

Fospha Marketing, "Visitor Stitching: Creating a Single Customer View", https://fospha.com/resources/blog/visitor-stitching-creating-a-single-customer, Jan. 1, 2020, 1 page.

(Continued)

*Primary Examiner* — Meng Li
(74) *Attorney, Agent, or Firm* — Ferguson Braswell Fraser Kubasta PC

(57) ABSTRACT

A method for automatic anonymous visitor identity resolution using machine learning, which includes generating a visitor histogram set from visitor events of a visitor event stream that include a visitor identifier and an internet protocol address, filtering a set of user identifiers into a candidate set of user identifiers based on the internet protocol address, obtaining one or more user histogram sets generated from user events that include user identifiers from the candidate set of user identifiers, and mapping the visitor identifier to a user identifier of the candidate set of user identifiers using a machine learning model and a histogram similarity matrix generated from the visitor histogram set, the one or more user histogram sets, and a set of histogram similarity functions. The method further includes presenting a response based on the mapping of the visitor identifier to the user identifier.

20 Claims, 8 Drawing Sheets

(56) References Cited

OTHER PUBLICATIONS

Tealium, "Visitor Stitching: Identity Resolution for Cross Device Users", https://tealium.com/resource/datasheet/visitor-stitching/, Jan. 1, 2020, 1 page.
Segment docs, "Personas Identity Resolution Overview", https://piwik.pro/blog/what-is-an-id-graph-and-how-can-it-benefit-cross-device-tracking/, Jan. 1, 2019, 3 pages.
Piwik Pro, "ID Graph: What is it and How can it Benefit Cross-Device Tracking", https://piwik.pro/blog/what-is-an-id-graph-and-how-can-it-benefit-cross-device-tracking/, Jun. 26, 2018, 11 pages.
Zawadzinski, Deterministic and Probabilistic Matching: How do They Work?, Clearcode, https://clearcode.cc/blog/deterministic-probabilistic-matching/, Dec. 15, 2016, 9 pages.
Scully, "What Makes Customer Identity Resolution for Marketing so Hard", Amperity&, https://amperity.com/blog/makes-customer-identity-resolution-marketing-hard/, Jan. 1, 2020, 6 pages.
Olmstead, "How to Build Segments with CDIM", https://konsole.zendesk.com/hc/en-us/articles/226951307-How-to-Build-Segments-with-CDIM, Jan. 29, 2019, 3 pages.
Kim, et al., "Probabilistic Visitor Stitching on Cross-Device Web Logs," 2017 International World Wide Web Conference Committee, Apr. 3, 2017, 9 pages.
Roy, et al., "Proabilistic Deduplication of Anonymous Web Traffic", WWW 2015, May 18, 2015, 2 pages.

\* cited by examiner

AUTOMATIC ANONYMOUS VISITOR IDENTITY RESOLUTION USING MACHINE LEARNING

BACKGROUND

A registered user of a website may visit and interact with the website before logging into the website. Events that are generated by interacting with the website (e.g., click events) before logging in may include a visitor identifier. Visitor identifiers uniquely identify different visitors of a website. Events from after logging in may include a user identifier. User identifiers uniquely identify different users of a website. Prior to logging in, a system may be unable to resolve which user identifiers correspond to which visitor identifiers. A challenge is to identify a user identifier that corresponds to a visitor identifier from events generated before a user logs into the website.

SUMMARY

In general, in one or more aspects, the disclosure relates to a method that includes generating a visitor histogram set from visitor events of a visitor event stream that include a visitor identifier and an internet protocol address, filtering a set of user identifiers into a candidate set of user identifiers based on the internet protocol address, obtaining one or more user histogram sets generated from user events that include user identifiers from the candidate set of user identifiers, and mapping the visitor identifier to a user identifier of the candidate set of user identifiers using a machine learning model and a histogram similarity matrix generated from the visitor histogram set, the one or more user histogram sets, and a set of histogram similarity functions. The method further includes presenting a response based on the mapping of the visitor identifier to the user identifier.

In general, in one or more aspects, the disclosure relates to a system that includes a processor and a memory coupled to the processor. The memory includes an application that executes on the processor, uses the memory, and is configured for generating a visitor histogram set from visitor events of a visitor event stream that include a visitor identifier and an internet protocol address, filtering a set of user identifiers into a candidate set of user identifiers based on the internet protocol address, obtaining one or more user histogram sets generated from user events that include user identifiers from the candidate set of user identifiers, and mapping the visitor identifier to a user identifier of the candidate set of user identifiers using a machine learning model and a histogram similarity matrix generated from the visitor histogram set, the one or more user histogram sets, and a set of histogram similarity functions. The application is further configured for presenting a response based on the mapping of the visitor identifier to the user identifier.

In general, in one or more aspects, the disclosure relates to a set of one or more non-transitory computer readable mediums with computer readable program code for generating a visitor histogram set from visitor events of a visitor event stream that include a visitor identifier and an internet protocol address, filtering a set of user identifiers into a candidate set of user identifiers based on the internet protocol address, obtaining one or more user histogram sets generated from user events that include user identifiers from the candidate set of user identifiers, and mapping the visitor identifier to a user identifier of the candidate set of user identifiers using a machine learning model and a histogram similarity matrix generated from the visitor histogram set, the one or more user histogram sets, and a set of histogram similarity functions. The set of non-transitory computer readable mediums further include computer readable program code for presenting a response based on the mapping of the visitor identifier to the user identifier.

Other aspects of the invention will be apparent from the following description and the appended claims.

DETAILED DESCRIPTION

Figure 1A:
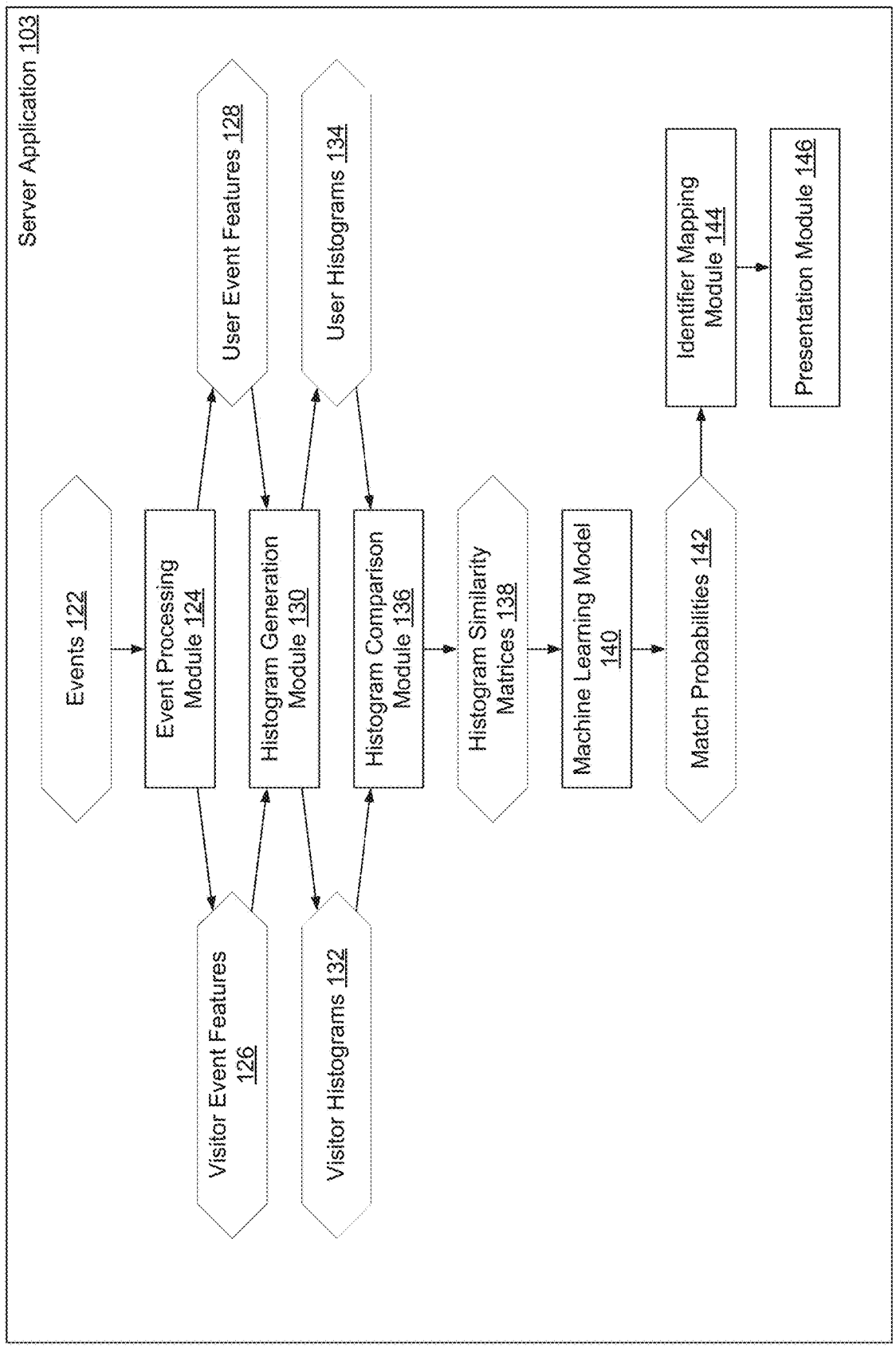
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure perform automatic anonymous visitor identity resolution using machine learning. A visitor interacts with a website before logging into the website as a registered user. The visitor is recognized as a registered user based on an analysis of the events generated by the visitor in interacting with the website prior to logging in. The recognition is performed by comparing a set of visitor histograms (referred to as a visitor histogram set) generated from the events of the visitor to a user histogram set generated from events generated by the corresponding user. A user identifier corresponding to the user histogram set with the highest match probability with the visitor histogram set is mapped to the visitor identifier of the visitor histogram set. To reduce the amount of comparisons, the pool of possible user identifiers may be filtered to remove user identifiers that have not been linked to the internet protocol address of the visitor events of the visitor identifier. Such filtering of the pool of possible user identifiers may be accomplished based on filtering criteria using attributes others than internet protocol address, e.g., mobile device identifier or the user agent string of the web browser used by the user or visitor.

An event is an interaction between a user device and a server that is recorded by the server. As an example, a web page of a website that is rendered on a browser of a user device may record events that represent the interaction of a user with a web page of the website. The events may include click events (e.g., a user clicking on a link to open a subsequent web page, a user right clicking on an object to open a right click menu, etc.) and non-click events (e.g., mouse movements, hovering the mouse over an object on the page, etc.). The events may be triggered and recorded by the browser on the user device, transmitted to the server, and recorded in a repository of the server. Visitor events are events generated by visitors of a website and user events are events generated by registered users of the website.

Each event may include several attributes that describe aspects of the user device, the user application, the server, the server application, the time, the date, etc. The table below includes an example listing of self descriptive attributes that may be recorded by a server in response to interaction with a user application for each event. The term "application" in the table below may refer to the application executing on the server. The term "session" in the table below may refer to the internet protocol (IP) session between a user application (e.g., a web browser) and a server application.

TABLE 1

| Attribute Name |
| --- |
| application_app_id |
| application_app_name |
| application_app_version |
| application_browser_browser_height |
| application_browser_browser_name |
| application_browser_browser_plugins |
| application_browser_browser_version |
| application_browser_browser_width |
| application_browser_cookies |
| application_browser_cookies_enabled |
| application_browser_encoding |
| application_browser_java_enabled |
| application_browser_javascript_version |
| application_browser_locale |
| application_browser_query_param |
| application_browser_screen_color_depth |
| application_browser_screen_height |
| application_browser_screen_width |
| application_browser_url |
| application_browser_url_host_name |
| application_browser_user_agent |
| application_forwarded_by_app_id |
| application_forwarded_by_offering_id |
| application_ip_address |
| application_mobile_build_id |
| application_mobile_build_model |
| application_mobile_carrier |
| application_mobile_device |
| application_mobile_device_id |
| application_mobile_device_type |
| application_mobile_network_type |
| application_offering_id |
| application_os |
| application_os_version |
| application_platform |
| application_properties |
| application_server_ip |
| application_server_timestamp |
| application_server_xff |
| cec_version |
| client_framework_version |
| data_version |

TABLE 1-continued

| Attribute Name |
| --- |
| event_device_type |
| event_event_category |
| event_event_id |
| event_event_name |
| event_event_value |
| event_page_channel |
| event_page_hierarchy |
| event_page_id |
| event_page_is_error_page |
| event_page_layout |
| event_page_page_detail |
| event_page_page_hierarchy |
| event_page_page_load_time |
| event_page_page_load_time_ms |
| event_page_page_name |
| event_page_page_path |
| event_page_page_title |
| event_page_page_topic_id |
| event_page_page_transition_time_ms |
| event_page_screenid |
| event_page_taxonomy_level1 |
| event_page_taxonomy_level2 |
| event_page_taxonomy_level3 |
| event_page_topic_id |
| event_page_url |
| event_properties |
| event_referrer_keyword |
| event_screen_id |
| event_timestamp |
| event_traffic_campaign_id |
| event_traffic_campaign_medium |
| event_traffic_campaign_source |
| event_traffic_campaign_type |
| event_traffic_dma |
| event_traffic_priority_code |
| event_traffic_recipe_id |
| event_traffic_referrer_url |
| event_traffic_test_id |
| event_traffic_visit_referrer |
| event_transmission_time_diff |
| folder_name |
| post_areacode |
| post_browser |
| post_browser_bit_width |
| post_browser_major |
| post_country |
| post_cpu |
| post_cpu_data_width |
| post_cpu_manufacturer |
| post_daily_visitor |
| post_device |
| post_domain |
| post_exclude_hit |
| post_first_hit_page_url |
| post_first_hit_pagename |
| post_first_hit_referrer |
| post_first_hit_time_gmt |
| post_geo_city |
| post_geo_country |
| post_geo_region |
| post_hourly_visitor |
| post_isp |
| post_last_hit_page_url |
| post_last_hit_time_gmt |
| post_last_visit_page_num |
| post_last_visit_start_time_gmt |
| post_latitude |
| post_longitude |
| post_manufacturer |
| post_metrocode |
| post_monthly_visitor |
| post_netspeed |
| post_new_visit |
| post_organization |
| post_os |
| post_os_data_width |
| post_os_major |
| post_os_manufacturer |

TABLE 1-continued

Attribute Name post_os_minor
post_os_patch
post_os_patch_minor
post_referrer_website
post_search_engine
post_timezone
post_visid_high
post_visid_low
post_visit_num
post_visit_page_num
post_visit_referrer
post_visit_search_engine
post_visit_start_page_url
post_visit_start_time_gmt
post_yearly_visitor
post_zip
session_ivid_client
session_ivid_server
session_properties
session_session_id
session_test_flag
session_user_id
session_visitor_id
system_time_unix
timestamp_day_of_month
timestamp_day_of_week
timestamp_hour
timestamp_month
timestamp_year
unique_key An event feature (also referred to as a "feature") is a combination of one or more attributes of an event. For example, the internet protocol (IP) address attribute of an event may identify the internet protocol address of the user device that detected the event, be a string data type (e.g. "192.118.72.182") and be used as an event feature. The operating system (OS) name attribute of an event may identify the OS used by the user device, be a string data type (e.g., "Windows NT 10.0; Win64; x64") extracted from a user agent string (e.g. "Mozilla/5.0 (Windows NT 10.0; Win64; x64) AppleWebKit/537.36 (KHTML, like Gecko) Chrome/79.0.3945.88 Safari/537.36"), and be used as an event feature. Additionally, the IP address and OS name attributes of an event may be combined to form another event feature (e.g., "192.118.72.182_x_Windows NT 10.0; Win64; x64").

A visitor identifier is an attribute of an event recorded by the system. A visitor identifier is assigned to each visitor of a website. Visitor identifiers are unique between the different visitors interacting with a website. Visitor identifiers may be reused over time. Different registered users may be assigned the same visitor identifier (which may be done over time intervals sufficiently separated in time, e.g., one year, to reduce misidentifying visitors and registered users) and a single user may be assigned multiple different visitor identifiers over time. Before logging in, an event may include only a visitor identifier (without a user identifier).

A user identifier is an attribute of an event recorded by the system. A user identifier is assigned to each user that has registered with a website and is unique between the users of the website. After logging in, an event may include both a visitor identifier and a user identifier.

A session is a period of activity during which a user or visitor interacts with a website. A single visitor identifier may be associated with one or more consecutive sessions of a visitor and a user identifier may be associated with multiple sessions.

A histogram is a collection of counts of the values of a feature of a set of events related to an identifier (e.g., a visitor identifier or a user identifier). A histogram may be generated from a set of events recorded during a session. The "x-axis" of a histogram identifies the different values of the event feature that make up the histogram. The "y-axis" of the histogram identifies the number of occurrences of the values of the feature for all of the events of the session of the histogram, counted over a pre-specified interval of time (e.g., one day, one month or six months).

A histogram similarity function expresses the degree of similarity between two histograms as a numeric value, with 0 representing no similarity, 1 representing perfect similarity according to that function, and increasing values denoting monotonically increasing degrees of similarity. The histograms may be generated from different sets of events but relate to the same feature from the respective events.

In equations 2-10 that follow, a histogram H of a visitor V or user U is represented as a set of (key, value) pairs:

$$H(W) = \{(k_i(W), c_i(W)) : i = 1, 2, \ldots N_{HW}\}, \quad \text{(Eq. 1)}$$

where W can be a visitor V or a user U. In Equation 1, the number of unique feature values that occurred for a given feature derived from the events used to compute the histogram H(W) is denoted as $N_{HW}$, the key $k_i(W)$ denotes the $i^{th}$ unique feature value that occurred, and the value $c_i(W)$ is the corresponding count of the number of times that feature value occurred in those events.

The probability density function (PDF) of a histogram H(W), denoted by PDF(W), is represented as a set of (key, probability value) pairs:

$$PDF(W) = \quad \text{(Eq. 2)}$$
$$\left\{ \left( k_i(W), p_i(W) = c_i(W) \Big/ \sum_k c_k(W) \right) : i = 1, 2, \ldots, N_{HW} \right\}$$

Equation. 2, the probability value $p_i(W)$ of a feature value $k_i(W)$ of a histogram is calculated by dividing a count of the value of the feature (represented by $c_i(W)$), by the sum of all counts (represented by $\sum_k c_k(W)$) of the histogram.

The following histogram similarity functions, which is not an exhaustive list, may be used.

$$\min\left\{\sum_i c_i(V), \sum_j c_j(U)\right\} \Big/ \max\left\{\sum_i c_i(V), \sum_j c_j(U)\right\} \quad \text{(Eq. 3)}$$

Equation 3 determines the count similarity between two histograms. The sum of the counts for each of the values of the feature of a first histogram is represented by $\sum_i c_i(V)$ and $\sum_j c_j(U)$ represents a similar sum for a second histogram. The minimum of the sums is divided by the maximum of the sums to generate the count similarity between the two histograms.

$$\min\{H_V.\text{size}, H_U.\text{size}\} / \max\{H_V.\text{size}, H_U.\text{size}\} \quad \text{(Eq. 4)}$$

Equation 4 determines the support count similarity between two histograms. $H_V.\text{size}$ represents the size $N_{HV}$ of the first histogram and equals the number of unique values of the feature of the first histogram that have occurred in the data used to compute the first histogram, and $H_U.\text{size}$ equals the analogous size $N_{HU}$ for the second histogram.

$$I(\text{argmax}_i\{c_i(V)\} == \text{argmax}_j\{c_j(U)\}) \quad \text{(Eq. 5)}$$

Equation 5 determines the histogram mode similarity between two histograms. The histogram mode similarity determines whether the mode (the value in the histogram with the highest count) of the first histogram (represented by $\mathrm{argmax}_i\{c_i(V)\}$) is the same as the mode of the second histogram (represented by $\mathrm{argmax}_j\{c_j(U)\}$). The function I(.) is an indicator function that equals 0 if its boolean argument is false, and 1 if its argument is true.

$$I(\mathrm{argmax}_i\{p_i(V)\}==\mathrm{argmax}_j\{p_j(U)\}) \qquad \text{(Eq. 6)}$$

Equation 6 determines the probability density function (pdf) mode similarity between two histograms. Instead of identifying whether the modes of the counts of the features are the same, as in Equation 5, the probability density function mode similarity identifies whether the modes of the probability density functions of the counts are the same. The probability density function is shown in Equation 2 above, which is applied to each of the features in the histograms, represented by $p_i(V)$ for the first histogram and by $p_j(U)$ for the second histogram.

$$|\{k_i(V)\} \cap \{k_j(U)\}|/|\{k_i(V)\} \cup \{k_j(U)\}| \qquad \text{(Eq. 7)}$$

Equation 7 determines the Jacquard similarity between two histograms. Here $\{k_i(V)\}$ denotes the set of unique feature values for the first histogram, and $\{k_i(U)\}$ denotes the similar set for the second histogram. The intersection of similar feature values between the first and second histograms (i.e., the set of feature values that occurred in common for the two histograms) is represented by the set $\{k_i(V)\} \cap \{k_j(U)\}$, and the size of this intersection (i.e., the number of feature values in common to both the histograms) is denoted by $|\{k_i(V)\} \cap \{k_j(U)\}|$. The union of unique feature values for both histograms is represented by $\{k_i(V)\} \cup \{k_j(U)\}$ and the size of this union (i.e., the total number of unique values that occurred in at least one of the two histograms) is denoted by $|\{k_i(V)\} \cup \{k_j(U)\}|$. The Jacquard similarity divides the intersection by the union.

$$\Sigma_i \min\{c_i(V), c_i(U)\}/\Sigma_i \max\{c_i(V), c_i(U)\} \qquad \text{(Eq. 8)}$$

Equation 8 determines the histogram Jacquard similarity between two histograms. For each possible value of a feature, the minimum count from either the first histogram or the second histogram are summed (represented by $\Sigma_i \min\{c_i(V), c_i(U)\}$) and the maximum counts are summed (represented by $\Sigma_i \max\{c_i(V), c_i(U)\}$). The sum of minimums is divided by the sum of maximums to generate the histogram Jacquard similarity.

$$\Sigma_i \min\{p_i(V), p_i(U)\}/\Sigma_i \max\{p_i(V), p_i(U)\} \qquad \text{(Eq. 9)}$$

Equitation 9 determines the probability density function Jacquard similarity between two histograms. For each feature, the minimum probability value from either the first histogram or the second histogram are summed (represented by $\Sigma_i \min\{p_i(V), p_i(U)\}$) and the corresponding maximum probability values are summed (represented by $\Sigma_i \max\{p_i(V), p_i(U)\}$). The sum of minimums is divided by the sum of maximums to generate the probability density function Jacquard similarity.

$$\Sigma_i(c_i(V) \cdot c_i(U))/\sqrt{\Sigma_k c_k^2(V) \Sigma_j c_j^2(U)} \qquad \text{(Eq. 10)}$$

Equation 10 determines the cosine similarity between two histograms. The count sets $\{c_i(V)\}$ and $\{c_i(U)\}$ of the two histograms and treated as ordered vectors $[c_i(V): i=1, 2, \ldots]$ and $[c_i(V): i=1, 2, \ldots]$ respectively. The dot product (represented by $\Sigma_i(c_i(V) \cdot c_i(U))$) of these two count vectors is divided by the product of the magnitudes of the two count vectors (represented by $\sqrt{\Sigma_k c_k^2(V) \Sigma_j c_j^2(U)}$) to generate the cosine similarity.

Figure 1B:
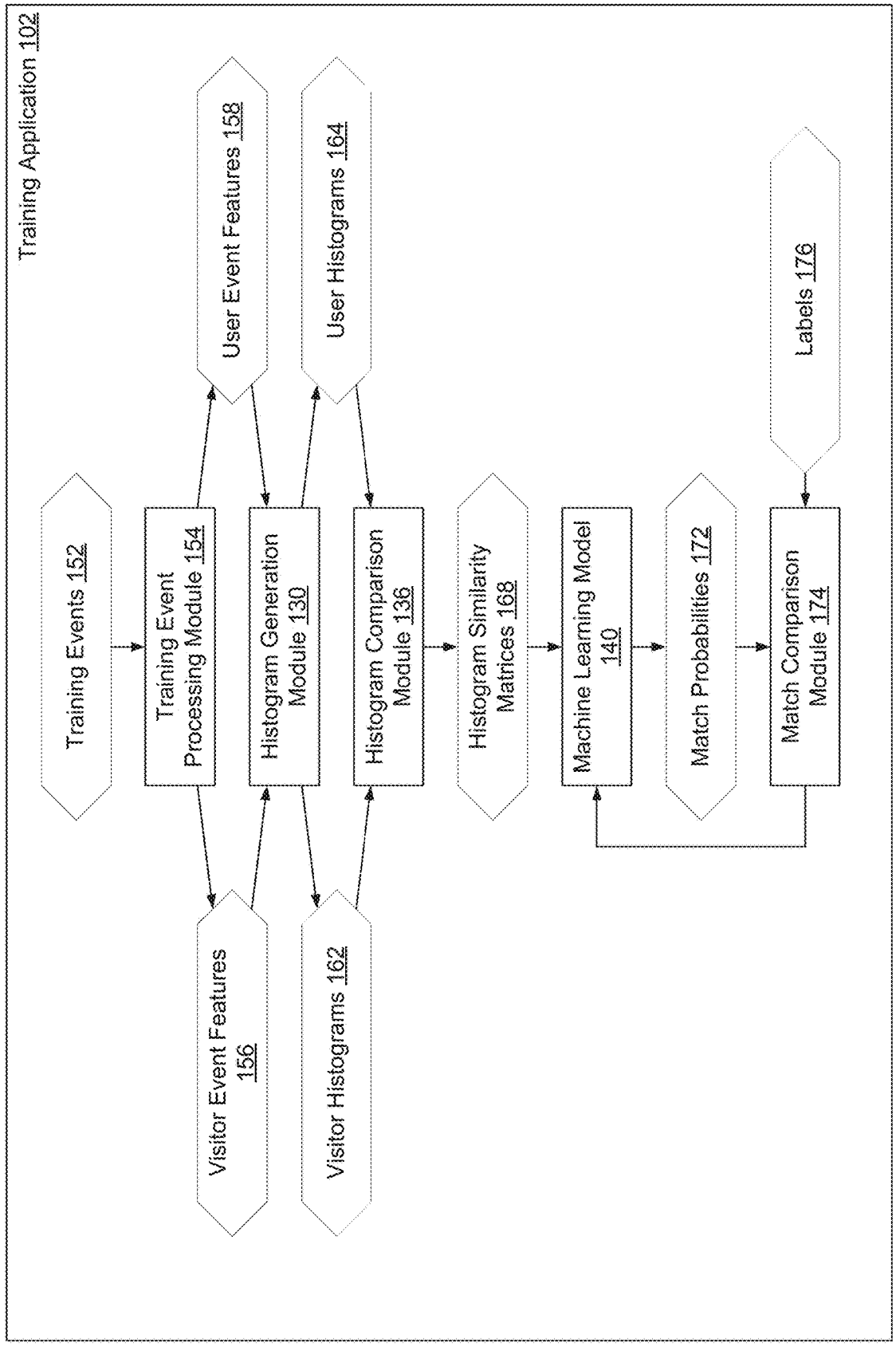
Figure 1C:
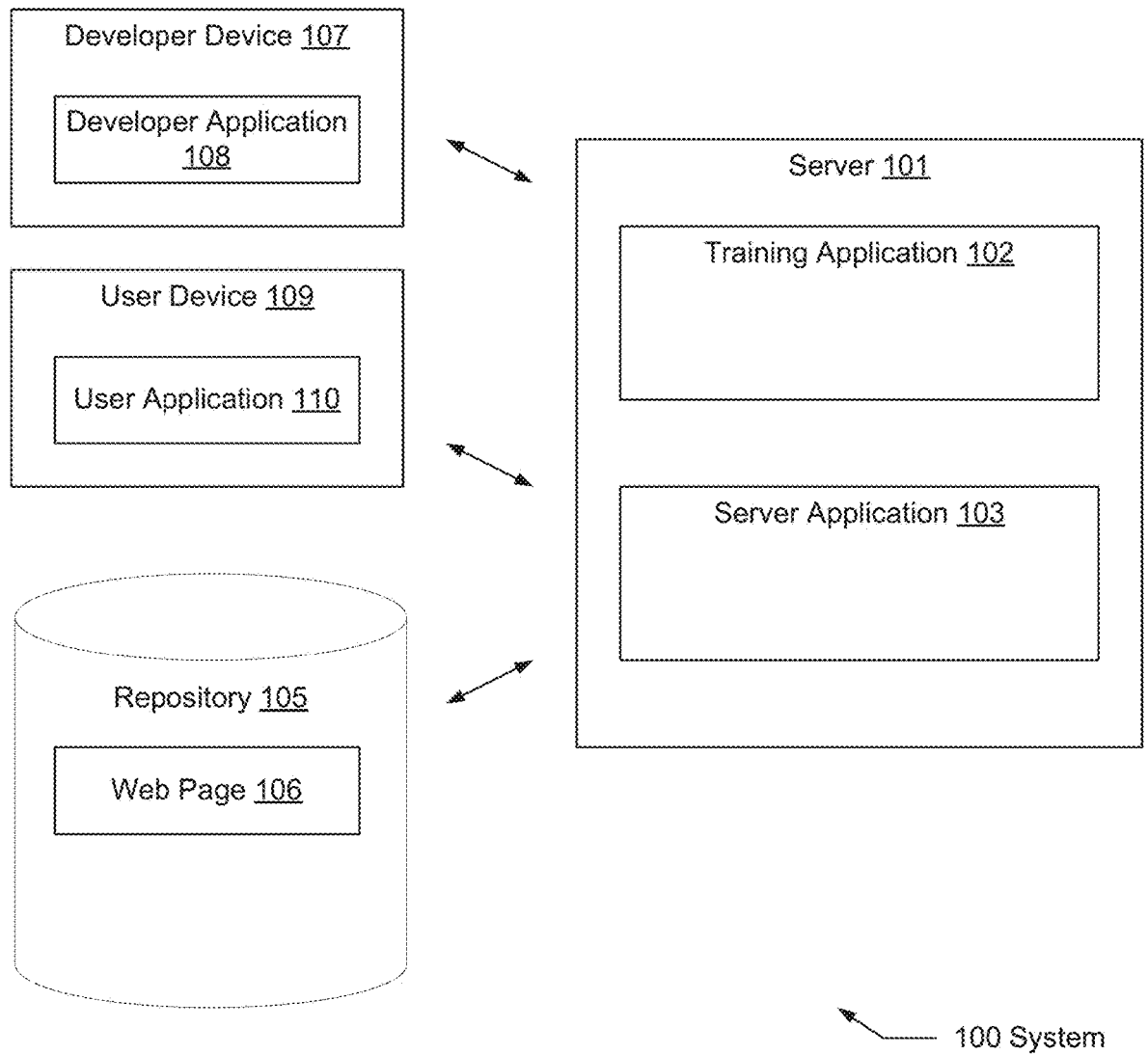

FIG. 1A, FIG. 1B, and FIG. 1C show diagrams of embodiments that are in accordance with the disclosure. FIG. 1A shows the server application (103), which performs automatic anonymous visitor identity resolution using machine learning. FIG. 1B shows the training application (102), which trains machine learning models used in automatic anonymous visitor identity resolution. FIG. 1C shows the system 100, which performs automatic anonymous visitor identity resolution using machine learning. The embodiments of FIG. 1A, FIG. 1B, and FIG. 1C may be combined and may include or be included within the features and embodiments described in the other figures of the application. The features and elements of FIG. 1A, FIG. 1B, and FIG. 1C are, individually and as a combination, improvements to the technology of machine learning. The various elements, systems, and components shown in FIG. 1A, FIG. 1B, and FIG. 1C may be omitted, repeated, combined, and/or altered as shown from FIG. 1A, FIG. 1B, and FIG. 1C. Accordingly, the scope of the present disclosure should not be considered limited to the specific arrangements shown in FIG. 1A, FIG. 1B, and FIG. 1C.

Turning to FIG. 1A, the server application (103) matches and maps user identifiers to visitor identifiers based on the events received by the system (100) (shown in FIG. 1C). The server application (103) is a set of one or more programs executing on the server (101) that interacts with the user application (110) of the user device (109) of FIG. 1C.

The server application (103) receives the events (122), which include visitor identifiers. The server application (103) generates event features, histograms, histogram similarity matrices, and match probabilities from the events (122) using the event processing module (124), the histogram generation module (130), the histogram comparison module (136), and the machine learning model (140). With the match probabilities, the server application (103) maps visitor identifiers to user identifiers with the identifier mapping module (144) and updates the presentation of the website to the user device with the presentation module (146).

The events (122) are the events received by the server application (103) that identify the user interaction with the web page (106) hosted by the server (101) (shown in FIG. 1C). The events (122) each include visitor identifiers. The events (122) may also include user identifiers if the user has already logged into the website hosted by the server (101).

The event processing module (124) is a set of programs of the server application (103) that processes the events (122) to generate event features (e.g., the visitor event features (126) and the user event features (128)). The event processing module (124) may process the events (122) by filtering the events (122) and generating the event features from the attributes of the events (122). The event processing module (124) may filter the events (122) by removing events that occur after a user/visitor has logged in to the system (100). The event processing module (124) may generate the event features from the attributes of the events (122) by extracting attributes from the events and combining groups of one or more attributes to form the event features. The event processing module (124) may generate the event features in real time in response to events received by the system. The event processing module (124) may also generate the event features periodically (e.g., every 10 seconds).

The visitor event features (126) are generated from the events (122) for which no user identifier has been linked or identified. The user event features (128) are generated from the events (122) for which a user identifier has been identified. A user identifier of an event may be identified by the user identifier being included with the event itself. The user identifier may also be identified by mapping a user identifier to an event (which may not include the user identifier) after the visitor identified by the visitor identifier logs in as a registered user. For example, a visitor may access the website generating events that do not include user identifiers, but only containing visitor identifiers. After the visitor logs in as a registered user, the user identifier corresponding to the registered user may be mapped to the previously generated events that contain the same visitor identifier.

The table below includes a list of event features (also referred to as "features") that may be generated from events received by the system and form the visitor event features (126) and the user event features (128). The definitions below indicate how a feature is created from one or more attributes of an event.

TABLE 2

| Feature Name | Definition |
| --- | --- |
| ipAddress | application_ip_address |
| timeStamp | dayOfWeek(application_server_timestamp) + "_x_" + hourOfDay(application_server_timestamp) |
| OS | application_os |
| appName | application_app_name |
| ipAddress_x_timeStamp | ipAddress + "_x_" + timeStamp |
| ipAddress_x_OS | ipAddress + "_x_" + OS |
| ipAddress_x_appName | ipAddress + "_x_" + appName |
| timeStamp_x_appName | timeStamp + "_x_" + appName |
| OS_x_appName | OS + "_x_" + appName |

Event attribute values appearing in events may be transformed before or after event attribute filtering. After this transformation, the resulting value of one event attribute can be combined with another value (which may also be transformed) of a different event attribute to form a new feature.

As an example, a timeStamp feature value can be extracted by transforming values of the application_server_timestamp attribute (which is usually of the form "year-month-day-hour-min-sec-millisecond") into the form dayOfWeek_x_timeOfDay (which is depicted in Table 2 above). This feature can then be combined with application_ip_address attribute to form the combined ipAddress_x_timestamp feature in Table 2.

As another example, a browserResolution feature can be extracted from the application_browser_browser_width attribute (shown in Table 1 above) and the application_browser_browser_height attribute (also shown in Table 1 above) by applying a transformation and combination to the individual values. The transformation may include dividing by 16 and rounding down (e.g., "1916"→"119" and "1002"→"62"). The transformed values may then be combined. E.g., "1916" and "1002" transformed and combined together create the combined feature value browserResolution="119_x_62". The rounding in this particular case is to reduce the number of unique feature values, which would typically result in histograms that are extremely wide (lots of unique feature values across visitors or users) but sparse (only a few of these values will have positive counts). Feature sparsity may result in poor training, which is avoided with this technique.

A feature may be extracted from an event by filtering, transforming, and combining one or more event attributes from the same event. This may be extended several ways.

As an example, a feature generated as above from one event may be combined with the same feature extracted from all the events in a sliding or non-overlapping window of consecutive events (corresponding to the same visitor or same user, as the case may be). This may be referred to as windowing. With windowing, click event patterns may be used that include a sequence of clicks to model the online behavior of a visitor or user.

From one perspective, the time-ordered sequence of events for a given user (or visitor, as the case might be) may be viewed as a table with an increasing number of rows, where rows represent time, and columns represent event attributes. The feature extraction approach described above extracts features from the column dimension, by filtering, transforming, and combining the columns (event attributes) to generate or extract a feature. Feature extraction may be extended into the row (time) dimension also. Features may be extracted by filtering, transforming, and combining columns into per-row (intra-event) features and by filtering, transforming, and combining successive per-row features in a sliding or non-overlapping window of rows (events), into per-window (inter-event) features.

As an example, a feature may be defined that includes the total number of clicks per day (clicksPerDay) which is computed by transforming each event (row) into the number '1', defining a window to be all the events (rows) with application_server_timestamp referring to the same day (a non-overlapping window), and then transforming this window of '1' values by summing them, to form the final feature. The histogram for this kind of feature may correspondingly be defined as the histogram of these per-window features over all the windows that cover the events for a given user or visitor.

With another approach, a feature may be defined by defining a specific type of window of rows, viewing the corresponding event rows in each window and the corresponding attribute columns as a matrix, and extracting the (per-window) feature by filtering, transforming, and combining one or more cells in each matrix corresponding to this window. This approach scans the matrix cells by columns first, and then by rows but the scan order of the cells may be either row first or column first.

For a given window type definition, different windows of the same type within the event stream may have different number of rows. The window may even be of growing size, e.g., one type of window may be defined to be all events from the beginning of the event stream to the current event.

The histogram generation module (130) is a set of programs of the server application (103) that generates the visitor histograms (132) from the visitor event features (126) and generates the user histograms (134) from the user event features (128). As an example, a histogram may include one of the features from Table 2 above on an x-axis with counts of the values for those features on the y-axis.

The histogram comparison module (136) is a set of programs of the server application (103) that generates the histogram similarity matrices (138) from pairs of the visitor histograms (132) and the user histograms (134). The histogram comparison module (136) uses a set of histogram similarity functions to generate the histogram similarity matrices (138) from pairs of the visitor histograms (132) and the user histograms (134), as further described below.

The histogram similarity matrices (138) identify the similarities between sets of the visitor histograms (132) and sets of the user histograms (134). A histogram similarity matrix is associated with a visitor identifier and user identifier. The visitor identifier of a histogram similarity matrix is the visitor identifier from the events (122) that were used to generate a visitor histogram. The user identifier of a histogram similarity matrix is the user identifier from the events (122) that were used to generate a user histogram.

A histogram similarity matrix includes elements organized by a first axis (e.g., a row axis) and a second axis (e.g., a column axis). The first axis identifies the feature used to generate the element of the matrix (as well as the corresponding user histogram and visitor histogram). The second axis identifies the histogram similarity function of an element that is used to compare the user histogram and the visitor histogram for the element. For example, a histogram similarity matrix may include nine rows (e.g., one for each of the features of Table 2) and eight columns (one for each of the Equations 3 through 10) for a total of 72 elements. More or fewer features and similarity functions may be used.

The machine learning model (140) is a set of programs of the server application (103) that generates the match probabilities (142) from the histogram similarity matrices (138). The machine learning model (140) may use a single histogram similarity matrix as an input and may output at least one match probability that is a value between 0 and 1. The machine learning model (140) may be a random forest model that forms an ensemble of decision trees, or may use gradient boosting of decision trees during the training of the machine learning model (140). The machine learning model (140) may be a linear classification model like a logistic regression classifier or a support vector machine, or a nonlinear classifier like a polynomial regression classifier, a radial basis function classifier or a multilayer neural network or deep learning classifier. Any of these models may use a regularization component during the training of the model (140).

The match probabilities (142) identify whether visitor identifiers should be matched with user identifiers. The visitor identifier of a match probability is the visitor identifier from the events (122) that were used to generate a visitor histogram. The user identifier of a match probability is the user identifier from the events (122) that were used to generate a user histogram.

The identifier mapping module (144) is a set of programs of the server application (103). The identifier mapping module (144) maps visitor identifiers to user identifiers based on the match probabilities (142). The identifier mapping module (144) may update events for which no user identifier was included to include the user identifier from a match probability.

The presentation module (146) a set of programs of the server application (103). The presentation module (146) updates the presentation of the website to the user application (110) on the user device (109) (shown in FIG. 1C). For example, the presentation module (146) may modify the web page (106) (shown in FIG. 1C) to include a login screen instead of a registration screen for access to the website hosted by the server (101) (shown in FIG. 1C). Additionally, the presentation module (146) may modify the web page (106) to reduce the number of clicks needed to access information from the website for a user based on matching the visitor identifier assigned to the user application (110) to the user identifier assigned to the user that has registered with the website.

Turning to FIG. 1B, the training application (102) trains machine learning models used by the system (100) (shown in FIG. 1C), including the machine learning model (140). The training application (102) is a set of one or more programs executing on the server (101) that may be controlled by a developer with developer application (108) and developer device (107) (shown in FIG. 1C).

The training events (152) are the historical events stored on the repository (105) (shown in FIG. 1C) that are used to train the models of the system (100). The training events (152) include events that may have been previously received by the server application (103) and identify historical user interaction with the website hosted by the system (100), which may include the web page (106) hosted by the server (101) (shown in FIG. 1C). The training events (152) each include visitor identifiers and may also include user identifiers.

The training event processing module (154) is a set of programs of the server application (103) that processes the training events (152) to generate the visitor event features (126) and the user event features (128). The training event processing module (154) processes the training events (152) by filtering the training events (152) and generating the event features from the attributes of the training events (152).

The training event processing module (154) filters the events (152) into visitor events and user events. Visitor events are events that are linked to a visitor identifier in a single session. User events are events that are linked to a user identifier and which may be linked to multiple visitor identifiers.

The training event processing module (154) may group the training events by visitor identifier. Each group of events may be for the same session having the same visitor identifier.

The training event processing module (154) may filter out events that do not have user identifiers and do not have internet protocol addresses that match the internet protocol addresses of the users of the system. This filtering may be based on additional or different criteria, e.g., a mobile device identifier may be used additionally or alternatively to the internet protocol address. The training event processing module (154) may also filter out the events that occur after a user/visitor has logged in to the system (100).

The training event processing module (154) may also filter out events for which the user identifier cannot be identified deterministically. Deterministic identification may be performed when, after a visitor logs in as a registered user, the user identifier for the user may be linked to the events generated by the user before logging in (i.e., while the user was a visitor), if the visitor identifier for the corresponding events are the same.

The training event processing module (154) generates the visitor event features (156) and the user event features (158) from the attributes of the training events (152). The event features are generated by extracting attributes from the training events (152) and combining groups of one or more attributes to form the event features.

The visitor event features (156) are generated from visitor events from the training events (152). The user event features (158) are generated from user events from the training events (152).

The histogram generation module (130) and the histogram comparison module (136) in the training application (102) may be the same as in the server application (103) (shown in FIG. 1A). The histogram generation module (130) generates the visitor histograms (162) from the visitor event features (156) and generates the user histograms (164) from the user event features (158). The visitor histograms (162) and the user histograms (164) are similar to the visitor histograms (132) and the user histograms (134) described above but are generated from the training events (152) instead of the from the events (122) (shown in FIG. 1A). The histogram comparison module (136) generates the histogram similarity matrices (168) from the visitor histograms (162) and the user histograms (164).

The machine learning model (140) generates the match probabilities (172) from the histogram similarity matrices (168). The machine learning model (140) is updated by the match comparison module (174).

The match comparison module (174) is a set of programs of the training application (102). The match comparison module (174) compares the match probabilities (172) to the labels (176). Based on the comparison, the match comparison module (174) updates the machine learning model (140). The update process may use gradient descent, regularization and/or gradient boosting, to adjust the weights and parameters of the machine learning model (140).

The labels (176) identify the correct outputs for the match probabilities (172), which indicate if the visitor identifier of the events used to form the visitor histogram set should be mapped to the user identifier of the events used to form the user histogram set. The labels (176) may be stored in the repository (105) (shown in FIG. 1C).

Turning to FIG. 1C, the system (100) is trained to perform automatic anonymous visitor resolution using machine learning by mapping user identifiers to events that include visitor identifiers. The system (100) includes the server (101), the repository (105), the developer device (107), and the user device (109). The server (101) may include the training application (102) and the server application (103).

The training application (102) is a program on the server (101). The training application (102) trains the machine learning models of the system (101), as further described in FIG. 1B. The training application (102) may be operated or controlled by the developer device (107) with the developer application (108).

The server application (103) is a program on the server (101). The server application (103) includes multiple programs and machine learning models used by the system (101) to interact with the user device (109), as further described in FIG. 1A.

Figure 4A:
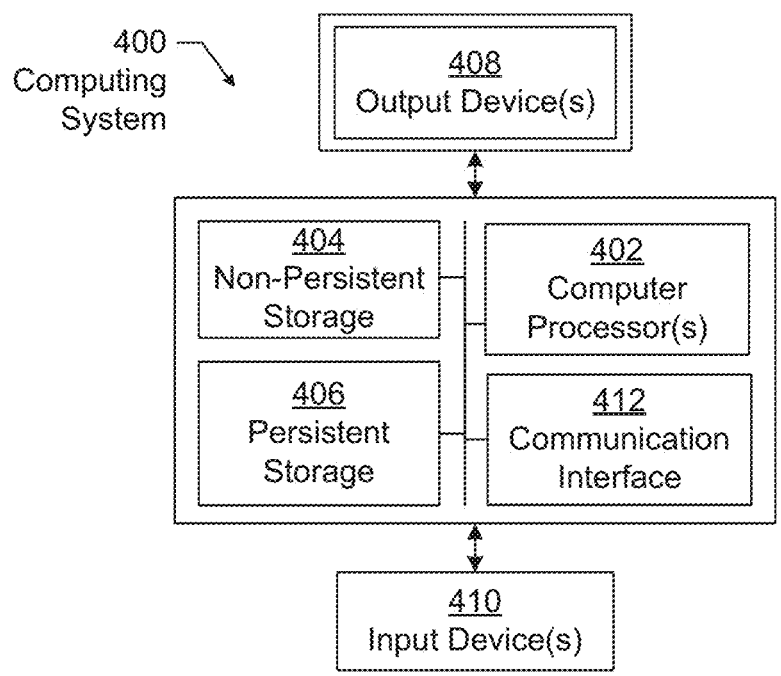
FIG. 4A and FIG. 4B show computing systems in accordance with disclosed embodiments.
Figure 4B:
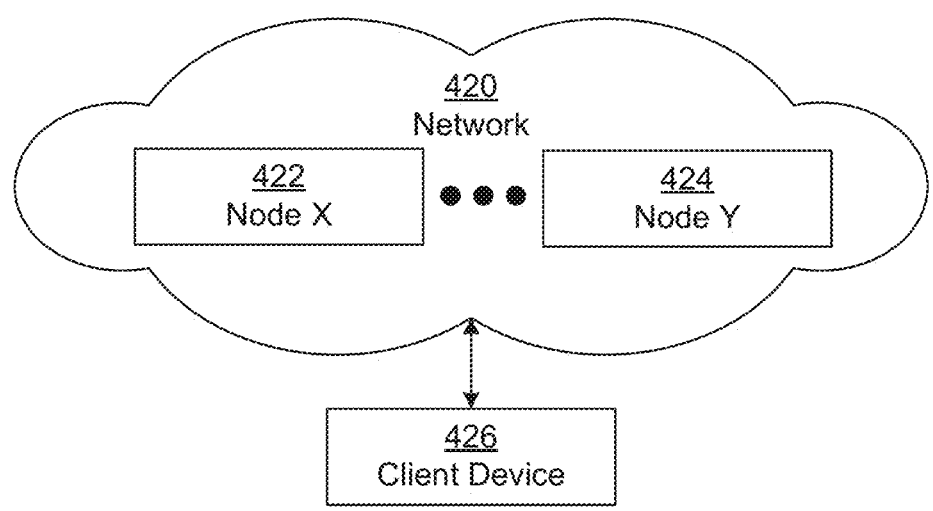

The server (101) is an embodiment of the computing system (400) and the nodes (422) and (424) of FIG. 4A and FIG. 4B. The server (101) may be one of a set of virtual machines hosted by a cloud services provider to deploy the training application (102) and the server application (103) for a web provider.

The repository (105) is a computing system that may include multiple computing devices in accordance with the computing system (400) and the nodes (422) and (424) described below in FIGS. 4A and 4B. The repository (105) may be hosted by a cloud services provider for the web provider. The cloud services provider may provide hosting, virtualization, and data storage services as well as other cloud services and the web provider may operate and control the data, programs, and applications that store and retrieve data from the repository. The data in the repository (105) may include (shown in FIG. 1A) the events (122), the visitor event features (126), the user event features (128), the visitor histograms (132), the user histograms (134), the histogram similarity matrices (138), the match probabilities (142); and may include (shown in FIG. 1B) the training events (152) the visitor event features (156), the user event features (158), the visitor histograms (162), the user histograms (164), the histogram similarity matrices (168), the match probabilities (172), and the labels (176).

The data in the repository (105) may also include the web page (106) that is part of a website hosted by the system (100) with which the users and the developers interact using the user device (109) and the developer device (107).

The developer device (107) is an embodiment of the computing system (400) and the nodes (422) and (424) of FIG. 4A and FIG. 4B. The developer device (107) includes the developer application (108) for accessing the training application (102). The developer application (108) may include a graphical user interface for interacting with the training application (102) to control training of the machine learning models of the system (100).

The user device (109) is an embodiment of the computing system (400) and the nodes (422) and (424) of FIG. 4A and FIG. 4B. The user device (109) may be used by visitors and registered users of the website hosted by the system (100). The user device (109) includes the user application (110) for accessing the server application (103). The user application (110) may include multiple interfaces (e.g., a graphical user interface, a voice interface, etc.) for interacting with the server application (103). A user may operate the user application (110) to perform tasks with the server application (103) to interact with the system (100). The results may be presented by being displayed by the user device (109) in the user application (110). The user of the user device (109) may be a customer of the web provider.

The developer application (108) and the user application (110) may be web browsers that access the training application (102) and the server application (103) using web pages hosted by the server (101). The developer application (108) and the user application (110) may additionally be web services that communicate with the training application (102) and the server application (103) using representational state transfer application programming interfaces (RESTful APIs). Although FIG. 1C shows a client server architecture, one or more parts of the training application (102) and the server application (103) may be local applications on the developer device (107) and the user device (109) without departing from the scope of the disclosure.

Figure 2:
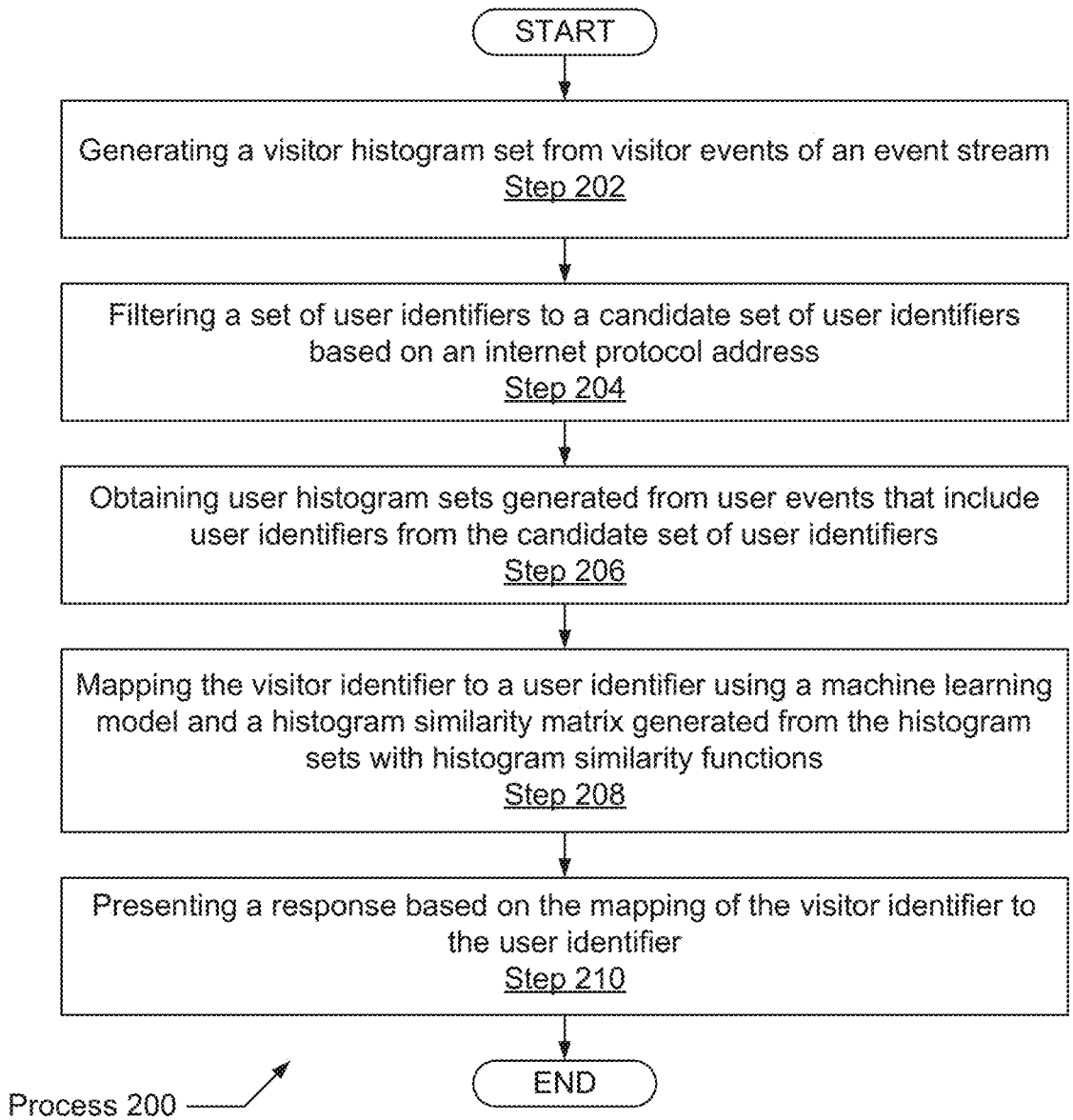
FIG. 2 shows a flowchart in accordance with disclosed embodiments.

FIG. 2 shows a flowchart of the processes (200) in accordance with the disclosure. The process (200) of FIG. 2 uses machine learning models to perform automatic anonymous visitor identity resolution using machine learning. The embodiment of FIG. 2 may be combined and may include or be included within the features and embodiments described in the other figures of the application. The features of FIG. 2 are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) generates histograms from events received by the system. The histograms are compared and, based on the comparison, visitor identifiers are mapped to user identifiers.

In Step 202, a set of visitor histograms (referred to as a visitor histogram set) is generated from visitor events of an event stream. The event stream is a set of events received by the system that includes visitor events and user events and includes events that occur before a user logs in and events that occur after a user logs in. The visitor events are the events from the event stream that include a visitor identifier, but which may not include or be linked to a user identifier.

Generating a visitor histogram set may include extracting a set of event attributes from the visitor events. The event attributes may be extracted by filtering the visitor events received by the system for specific event attributes. The specific event attributes may include internet protocol address, time stamp (date, time, day of week, etc.), operating system name, application name, browser height, browser width, etc.

One or more attributes may be combined to form a feature used in a histogram. For example, a first event attribute (internet protocol address) may be combined with a second event attribute (e.g., time stamp) to form a first event feature that includes the information from both the first event attribute and the second event attribute. As another example, the browser width (e.g., "640") and browser height (e.g., "480") may be used as individual features or be combined (e.g., "640_x_480") to form a single feature.

Additional information may be extracted or derived from the attributes by a transformation step. For example, the time stamp may not originally include the day of the week or the week of the year for the time stamp and the day of the week and the week of the year may be identified from the date of the time stamp.

A set of multiple event features may be generated from the combinations of one or more event attributes. Table 2 above, which is not exhaustive, lists additional features that may be formed from the attributes of the events received by the system.

A set of event features may be extracted from the visitor events. The extracted set of event features may form the basis of multiple visitor histograms that may be differentiated by one or more of an internet protocol address, a time or date of activity (e.g., hour of day, day of week, day of month), etc.

Multiple visitor histogram sets may be generated that correspond to multiple visitor identifiers. Each visitor histogram set may correspond to one visitor identifier.

In Step 204, a set of user identifiers are filtered into a candidate set of user identifiers based on an internet protocol address. The set of user identifiers may be filtered by removing user identifiers that are not included in or linked to events having an internet protocol address that matches the internet protocol address from the visitor events.

The algorithm to generate the candidate set of user identifiers uses the internet protocol addresses of the visitor events of the visitors to the website. For each visitor identifier, the set of internet protocol addresses appearing in the event stream is collected, and the candidate set of user identifiers is generated as the set of all user identifiers that used at least one of the internet protocol addresses from the visitor events from the event stream. For example, for a visitor identifier used with an internet protocol address, the user identifiers that have not been used with the same internet protocol address may be removed from the pool of possible user identifiers for the given visitor identifier. The filtering based on the internet protocol address may be performed separately for each visitor identifier.

A visitor identifier with an internet protocol address that is used by too many users may not be efficiently resolvable. If the size of the candidate set of user identifiers for a visitor identifier exceeds a pre-defined fixed size K (e.g., K=1000), then the resolution of that visitor identifier may be not be attempted, to reduce the computational workload of the system. Filtering by the internet protocol address may occur before event attribute extraction, feature generation, and histogram generation, which may reduce the workload of the system.

In Step 206, user histogram sets are obtained that are generated from user events that include user identifiers from the candidate set of user identifiers. The user histogram sets may be obtained from a repository that has previously generated the user histogram sets. The user histogram sets are generated from user events that include an internet protocol address that matches the internet protocol address of a visitor histogram set to which the user histogram sets will be compared. The user histogram sets include features that are generated from the event attributes extracted from user events that are received by the system.

In Step 208, a visitor identifier is mapped to a user identifier of the candidate set of user identifiers using a machine learning model and a histogram similarity matrix generated from a visitor histogram set, user histogram sets, and a set of histogram similarity functions. Mapping the visitor identifier to the user identifier may include comparing the visitor histogram set to the user histogram sets, generating a match probability from the histogram sets, and identifying the user histogram set with the highest match probability.

A visitor histogram set may be compared to a user histogram set using the set of histogram similarity functions to generate a histogram similarity matrix. The histogram similarity functions may include the functions from Equations 1 through 8 above. The output of each histogram similarity function is used as an element of the histogram similarity matrix, which describes the calculated similarity between an input visitor histogram set and an input user histogram set. Multiple histogram similarity vectors may be generated, one for each pairing of a visitor histogram set with a user histogram set.

The histogram similarity matrix may be input into the machine learning model to generate a match probability between the visitor histogram set and the user histogram set. The machine learning model may be an ensemble model, such as a random forest model. It might also be a linear or nonlinear classification model. The machine learning model may generate a set of rules or formulas that are applied to the histogram similarity matrix vector to form the match probability, which may be a continuous value in the range [0, 1] with lower values indicating less of a match and higher values indicating more of a match.

The user histogram set having the highest match probability of the user histogram sets is identified. A visitor histogram set may be compared to multiple user histogram sets and for each pairing of the visitor histogram set with a user histogram set, a histogram similarity matrix and match probability are generated. The match probability with the highest value is linked to a single user histogram set and a single user identifier. The user identifier of the user histogram set of the highest matching value is identified as the user identifier that is mapped to the visitor identifier of the visitor histogram set.

The machine learning model that generates a match probability from a histogram similarity matrix may be trained as an ensemble model. In an ensemble model, the individual machine learning models that comprise the ensemble each generate individual outputs using the same input histogram similarity matrix, and the ensemble stage combines these outputs to generate the match probability output. Other machine learning models and algorithms may be used, including linear classification models like logistic regression models and support vector machines, and non-linear classification models like polynomial classifiers, radial basis function classifiers and multilayer neural network and deep learning classifiers, etc. Each of these machine learning models may use gradient descent, regularization and gradient boosting during the training of the model.

Training data for the machine learning model may be generated from historical event data. The historical event data may include multiple visitor identifiers that are deterministically mapped between multiple user identifiers by one or more login or post-login events. For example, a stream of events may include visitor events that include a visitor identifier but are without a user identifier. The visitor events may be followed by subsequent user events that have the same visitor identifier as the visitor events during a session and which include a login event to identify the user and user identifier for the preceding visitor events. In this case, the user identifier of the user events may be mapped to the preceding visitor events and labeled as a match to the visitor identifier.

The historical event data may be filtered to remove the login events and post login events. The post login events include events associated with a user identifier after a login event is associated with the user identifier. The events for which a user identifier is known and which occur prior to a login event may be used as the training data to train the machine learning model to predict and identify matches between the visitor identifiers and user identifiers based on the event features, histogram sets, and histogram similarity matrices by generating match probabilities.

In Step 210, a response is presented based on the mapping of the visitor identifier to the user identifier. The response may include updates to the website based on the mapping of the visitor identifier to the user identifier. For example, the response may include a login page that is pre-filled in with user information instead of a blank registration page. As another example, the number of clicks needed by a user to access certain pages may be reduced by adjusting link recommendations in the pages served to the user that are based on the users click event history.

Figure 3A:
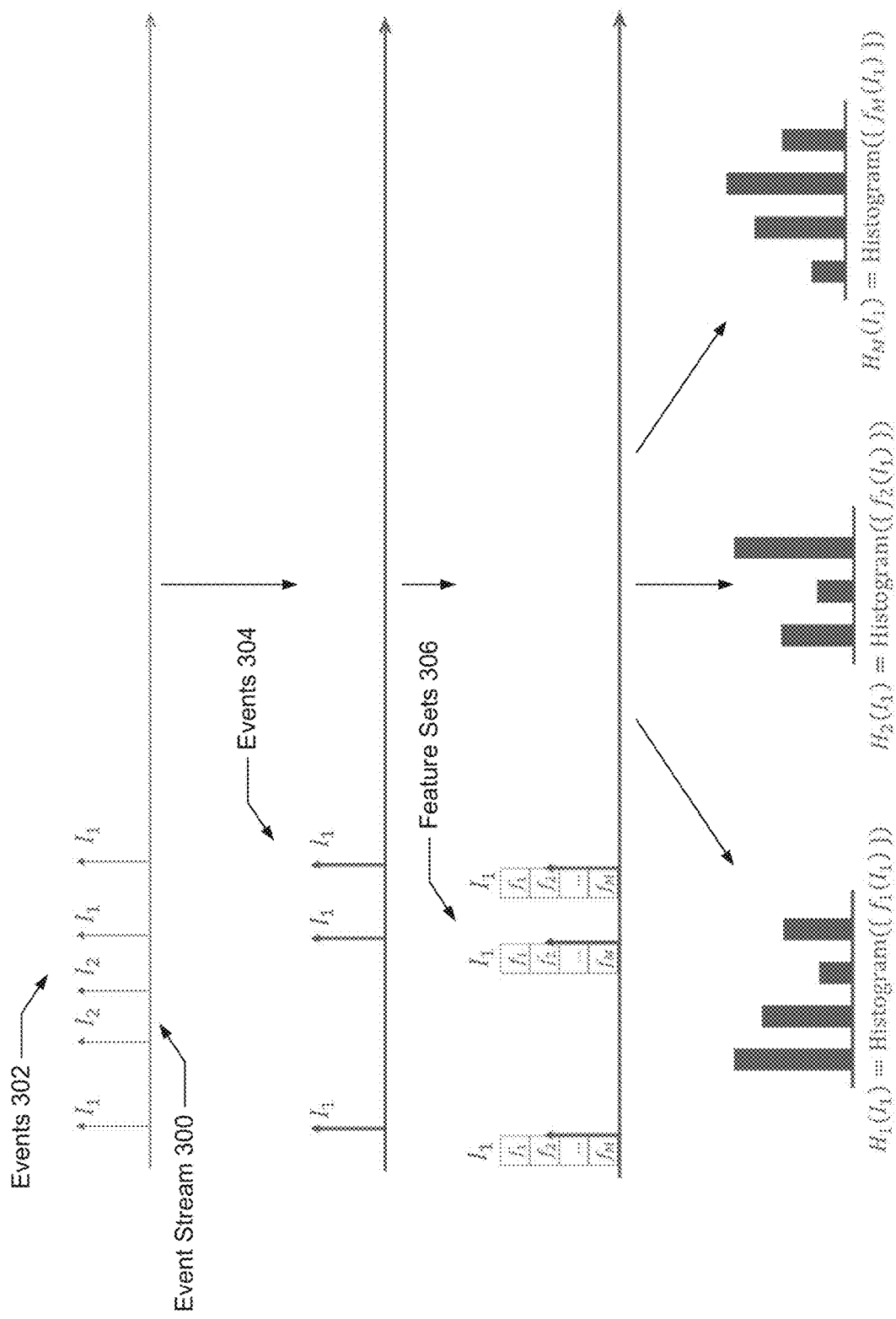
FIG. 3A, FIG. 3B, and FIG. 3C show examples in accordance with disclosed embodiments.
Figure 3B:
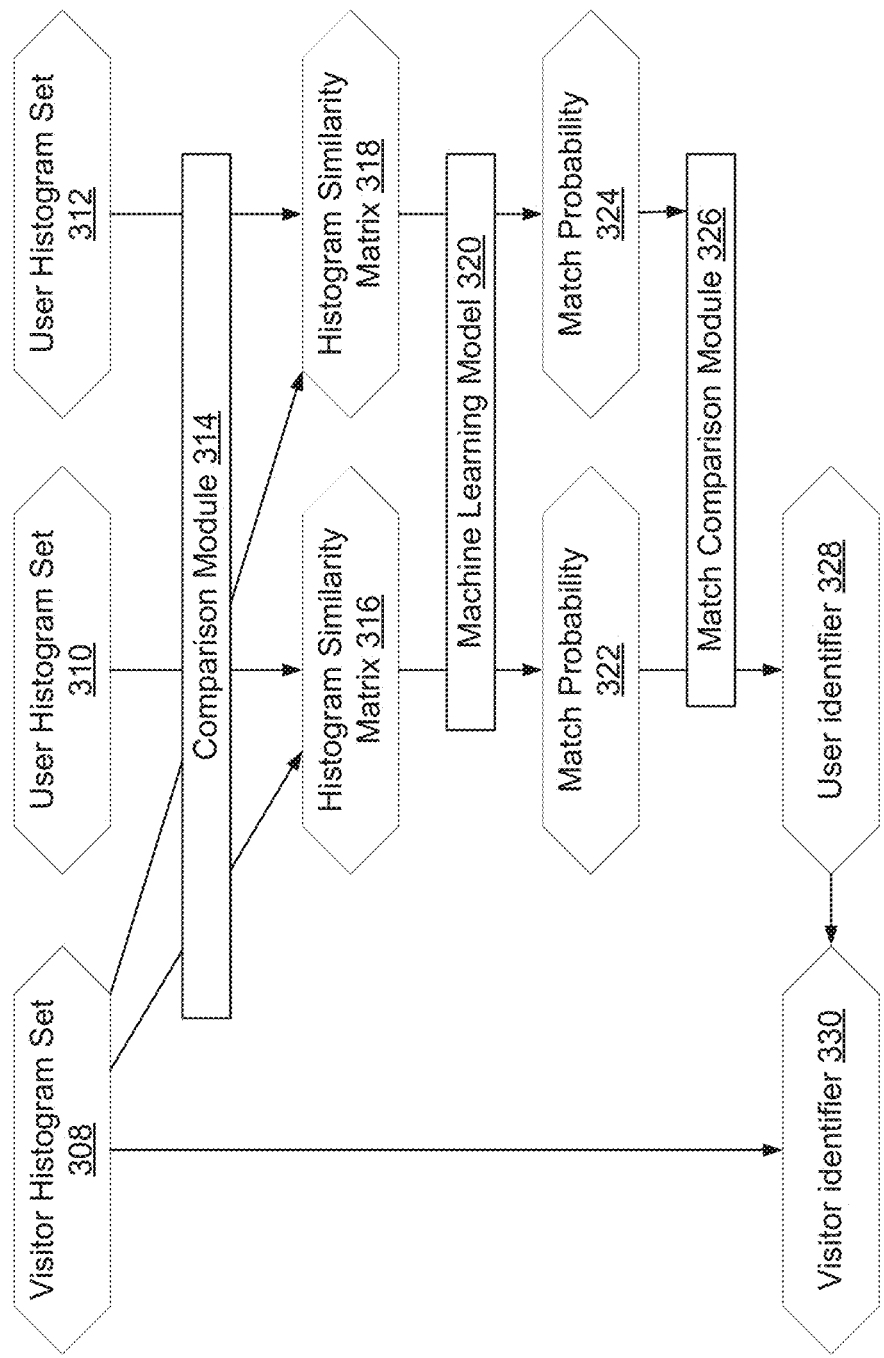
Figure 3C:
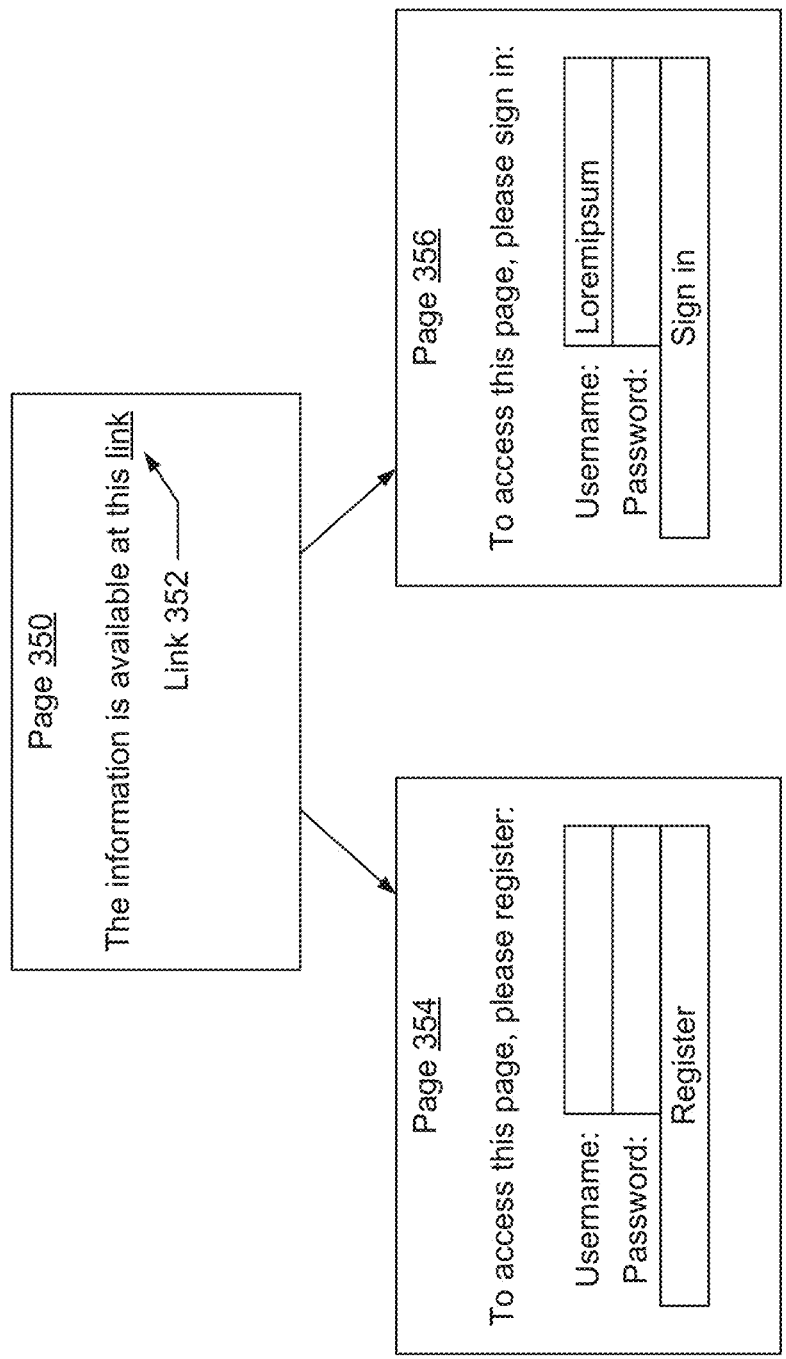

FIG. 3A, FIG. 3B, and FIG. 3C show an example of systems and interfaces in accordance with the disclosure. FIG. 3A shows an example of generating a visitor histogram set from an event stream. FIG. 3B shows an example of mapping a user identifier to a visitor identifier. FIG. 3C shows an example of modifying a web page based on mapping user identifiers to visitor identifiers. The embodiments of FIG. 3A, FIG. 3B, and FIG. 3C may be combined and may include or be included within the features and embodiments described in the other figures of the application. The features and elements of FIG. 3A, FIG. 3B, and FIG. 3C are, individually and as a combination, improvements to the technology of computing systems and machine learning systems. The various features, elements, widgets, components, and interfaces shown in FIG. 3A, FIG. 3B, and FIG. 3C may be omitted, repeated, combined, and/or altered as shown. Accordingly, the scope of the present disclosure should not be considered limited to the specific arrangements shown in FIG. 3A, FIG. 3B, and FIG. 3C.

Turning to FIG. 3A, the event stream (300) includes the events (302) that include different visitor identifiers ($I_1$ and $I_2$). The events (302) are received by the system from browsers that operate on user devices that have connected to the server, record user events (including clicks on links), and transmit the events to the server.

The events (302) are filtered by the system to identify the three events (304). The three events (304) each include the same visitor identifier ($I_1$).

The three feature sets (306) are extracted from the events (304). Certain features may include combinations of one or more features. A set of features is generated for each event.

The visitor histogram set (308) is generated from the feature sets (306). A histogram may be generated for each feature from the set of features for the events (304). The x-axis identifies the possible values of a feature and the y-axis identifies the number of occurrences of a value of a feature in the events (304).

Turning to FIG. 3B, the visitor histogram set (308) is compared with the user histogram set (310) and the user histogram set (312) by the comparison module (314). The comparison module (314) uses a set of similarity functions to generate the histogram similarity matrix (316) from the visitor histogram set (308) and the user histogram set (310) and to generate the histogram similarity matrix (318) from the visitor histogram set (308) and the user histogram set (312).

The histogram similarity matrix (316) and the histogram similarity matrix (318) may be input separately to the machine learning model (320). The machine learning model (320) generates the match probability (322) from the histogram similarity matrix (316) and generates the match probability (324) from the histogram similarity matrix (318).

The match probability (322) and the match probability (324) are compared with the match comparison module (326). The match comparison module (326) identifies the match probability (322) as having the highest value as compared to the match probability (324) and identifies the user identifier (328), which corresponds to the user histogram set (310), as the user with the best match to the visitor identified with the visitor identifier (330), which corresponds to the visitor histogram set (308).

Turning to FIG. 3C, a visitor may click on the link (352) of the page (350). If a user identifier has not been mapped to the visitor identifier of the visitor, then the system may provide the page (354) asking the visitor to register with the website. If a user identifier has been mapped to the visitor identifier of the visitor, then the system may provide the page (356), which asks the visitor/user to log in and pre-fills the username with that of the user.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
generating a visitor histogram set from visitor events of a visitor event stream that include a visitor identifier and an internet protocol address, wherein the visitor identifier is assigned to a visitor of a system;
filtering a set of user identifiers into a candidate set of user identifiers based on the internet protocol address, wherein the user identifier is assigned to a registered user of the system;
obtaining one or more user histogram sets generated from user events that include user identifiers from the candidate set of user identifiers;
mapping the visitor identifier to a user identifier of the candidate set of user identifiers using a machine learning model and a histogram similarity matrix generated from the visitor histogram set, the one or more user histogram sets, and a set of histogram similarity functions; and
presenting a response based on the mapping of the visitor identifier to the user identifier.

2. The method of claim 1, further comprising:
comparing the visitor histogram set and a user histogram set of the one or more user histogram sets with the set of histogram similarity functions to generate a histogram similarity matrix;
inputting the histogram similarity matrix into the machine learning model to generate a match probability between the visitor histogram set and the user histogram set; and
identifying the user histogram set as having a highest match probability of the one or more user histogram sets.

3. The method of claim 1, further comprising:
filtering the set of user identifiers by removing user identifiers that are not included in events having an internet protocol address in common with the visitor events from the visitor event stream, from the set of user identifiers to form the candidate set of user identifiers.

4. The method of claim 1, further comprising:
extracting a set of event attributes from the visitor events by filtering the visitor events for the event attributes of the set of event attributes;
combining a first event attribute with a second event attribute to form a first event feature; and
generating a set of event features from the set of event attributes, the set of event features including the first event feature.

5. The method of claim 1, further comprising:
extracting a set of event features from the visitor events; and
generating a plurality of visitor histogram sets that includes the visitor histogram set and corresponds to a plurality of visitor identifiers that include the visitor identifier.

6. The method of claim 1, further comprising:
generating training data from historical event data that includes multiple visitor identifiers deterministically mapped to multiple user identifiers by one or more login or post-login events, the multiple user identifiers including the user identifier; and
filtering the historical event data to remove the login events and post login events, the post login events including events associated with a user identifier that occur after a login event is associated with the user identifier.

7. The method of claim 1, further comprising:
training the machine learning model as an ensemble model.

8. A system comprising:
a processor;
a memory coupled to the processor;
the memory comprising an application, wherein the application executes on the processor, uses the memory, and is configured for:
generating a visitor histogram set from visitor events of a visitor event stream that include a visitor identifier and an internet protocol address, wherein the visitor identifier is assigned to a visitor of a system;
filtering a set of user identifiers into a candidate set of user identifiers based on the internet protocol address, wherein the user identifier is assigned to a registered user of the system;

obtaining one or more user histogram sets generated from user events that include user identifiers from the candidate set of user identifiers;

mapping the visitor identifier to a user identifier of the candidate set of user identifiers using a machine learning model and a histogram similarity matrix generated from the visitor histogram set, the one or more user histogram sets, and a set of histogram similarity functions; and presenting a response based on the mapping of the visitor identifier to the user identifier.

9. The system of claim 8, wherein the application is further configured for:

comparing the visitor histogram set and a user histogram set of the one or more user histogram sets with the set of histogram similarity functions to generate a histogram similarity matrix;

inputting the histogram similarity matrix into the machine learning model to generate a match probability between the visitor histogram set and the user histogram set; and identifying the user histogram set as having a highest match probability of the one or more user histogram sets.

10. The system of claim 8, wherein the application is further configured for:

filtering the set of user identifiers by removing user identifiers that are not included in events having an internet protocol address in common with the visitor events from the visitor event stream, from the set of user identifiers to form the candidate set of user identifiers.

11. The system of claim 8, wherein the application is further configured for:

extracting a set of event attributes from the visitor events by filtering the visitor events for the event attributes of the set of event attributes;

combining a first event attribute with a second event attribute to form a first event feature; and generating a set of event features from the set of event attributes, the set of event features including the first event feature.

12. The system of claim 8, wherein the application is further configured for:

extracting a set of event features from the visitor events; and generating a plurality of visitor histogram sets that includes the visitor histogram set and corresponds to a plurality of visitor identifiers that include the visitor identifier.

13. The system of claim 8, wherein the application is further configured for:

generating training data from historical event data that includes multiple visitor identifiers deterministically mapped to multiple user identifiers by one or more login or post-login events, the multiple user identifiers including the user identifier; and filtering the historical event data to remove the login events and post login events, the post login events including events associated with a user identifier that occur after a login event is associated with the user identifier.

14. The system of claim 8, wherein the application is further configured for:

training the machine learning model as an ensemble model.

15. A set of one or more non-transitory computer readable mediums comprising computer readable program code for:

generating a visitor histogram set from visitor events of a visitor event stream that include a visitor identifier and an internet protocol address, wherein the visitor identifier is assigned to a visitor of a system;

filtering a set of user identifiers into a candidate set of user identifiers based on the internet protocol address, wherein the user identifier is assigned to a registered user of the system;

obtaining one or more user histogram sets generated from user events that include user identifiers from the candidate set of user identifiers;

mapping the visitor identifier to a user identifier of the candidate set of user identifiers using a machine learning model and a histogram similarity matrix generated from the visitor histogram set, the one or more user histogram sets, and a set of histogram similarity functions; and presenting a response based on the mapping of the visitor identifier to the user identifier.

16. The set of one or more non-transitory computer readable mediums of claim 15, further comprising computer readable program code for:

comparing the visitor histogram set and a user histogram set of the one or more user histogram sets with the set of histogram similarity functions to generate a histogram similarity matrix;

inputting the histogram similarity matrix into the machine learning model to generate a match probability between the visitor histogram set and the user histogram set; and identifying the user histogram set as having a highest match probability of the one or more user histogram sets.

17. The set of one or more non-transitory computer readable mediums of claim 15, further comprising computer readable program code for:

filtering the set of user identifiers by removing user identifiers that are not included in events having an internet protocol address in common with the visitor events from the visitor event stream, from the set of user identifiers to form the candidate set of user identifiers.

18. The set of one or more non-transitory computer readable mediums of claim 15, further comprising computer readable program code for:

extracting a set of event attributes from the visitor events by filtering the visitor events for the event attributes of the set of event attributes;

combining a first event attribute with a second event attribute to form a first event feature; and generating a set of event features from the set of event attributes, the set of event features including the first event feature.

19. The set of one or more non-transitory computer readable mediums of claim 15, further comprising computer readable program code for:

extracting a set of event features from the visitor events; and generating a plurality of visitor histogram sets that includes the visitor histogram set and corresponds to a plurality of visitor identifiers that include the visitor identifier.

20. The set of one or more non-transitory computer readable mediums of claim 15, further comprising computer readable program code for:

generating training data from historical event data that includes multiple visitor identifiers deterministically mapped to multiple user identifiers by one or more login or post-login events, the multiple user identifiers including the user identifier; and filtering the historical event data to remove the login events and post login events, the post login events including events associated with a user identifier that occur after a login event is associated with the user identifier.

\* \* \* \* \*